Dec. 7, 1965  L. BAUM  3,221,577
OPTICAL SYSTEM FOR MACHINES
Filed Jan. 29, 1963  2 Sheets-Sheet 1
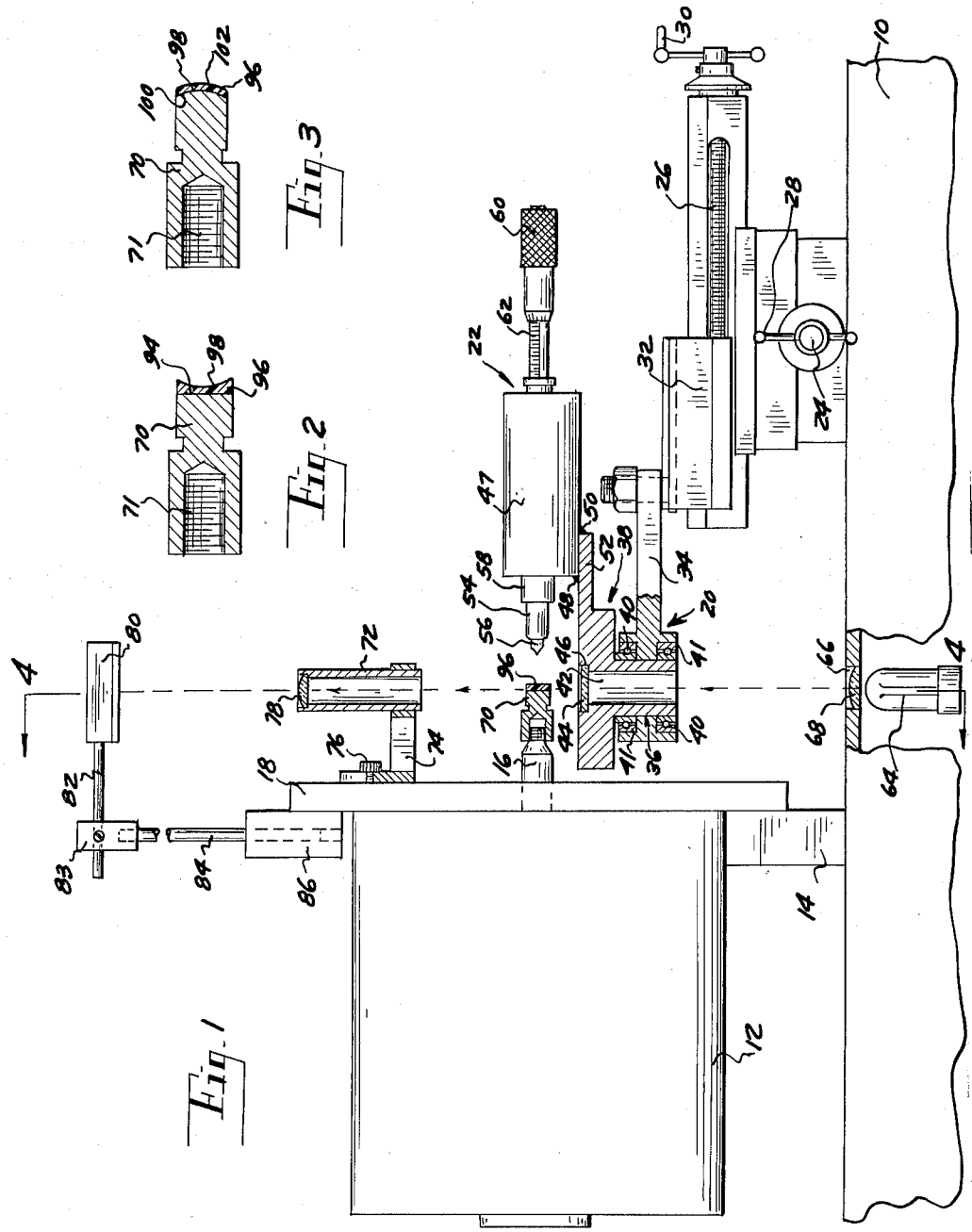
INVENTOR.
LEON BAUM.
BY Allen M Krass
ATTORNEY Dec. 7, 1965      L. BAUM      3,221,577
OPTICAL SYSTEM FOR MACHINES
Filed Jan. 29, 1963      2 Sheets-Sheet 2
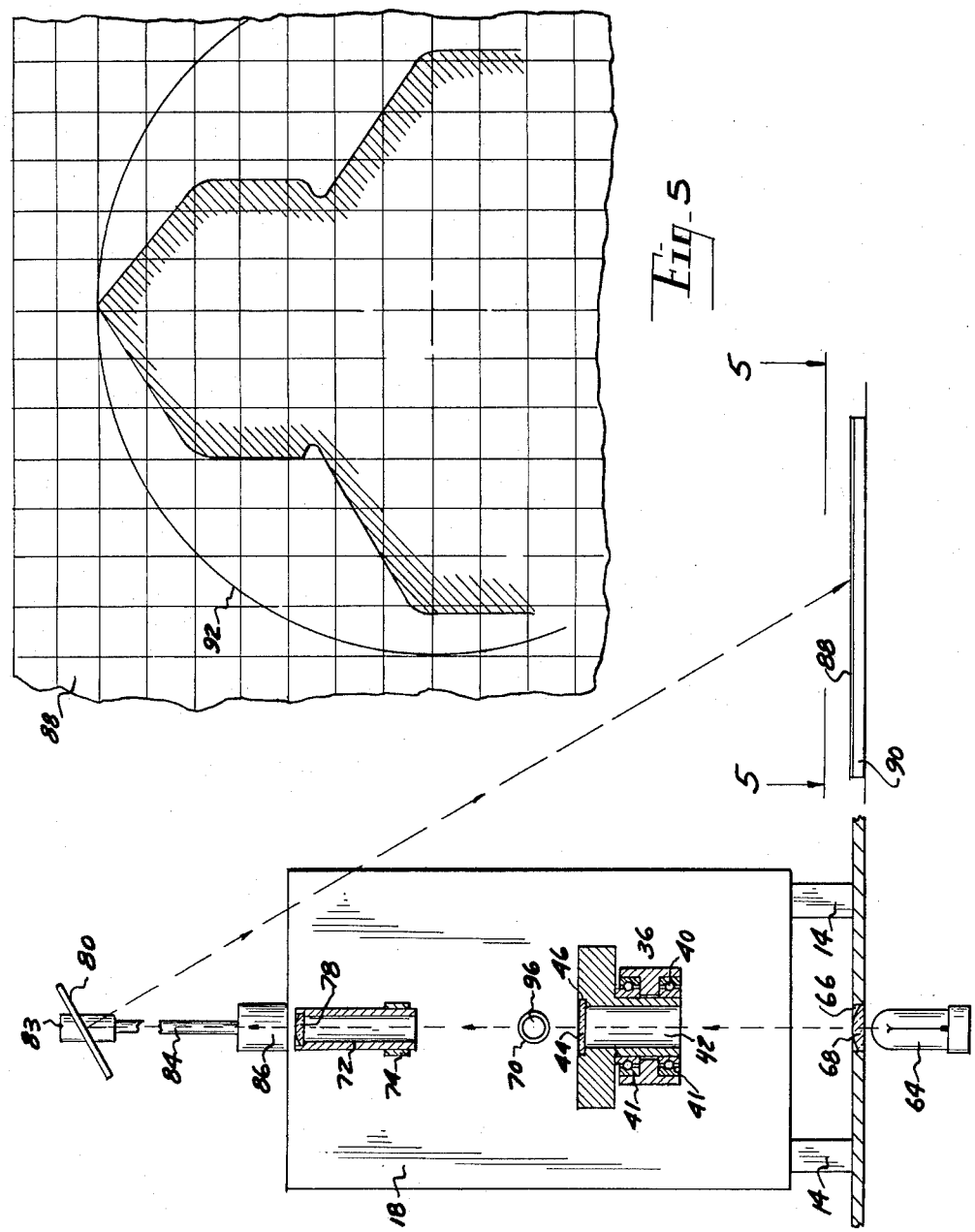
INVENTOR.
LEON BAUM.
BY
ATTORNEY

United States Patent Office 3,221,577
Patented Dec. 7, 1965

3,221,577
OPTICAL SYSTEM FOR MACHINES
Leon Baum, 2170 Westhampton, Oak Park, Mich.
Filed Jan. 29, 1963, Ser. No. 254,619
2 Claims. (Cl. 82—12)

This invention relates to an improvement in cutting machines and more specifically has reference to an optical system for such machines in which an image of the workpiece and the cutting tool is projected on a viewing surface.

Workpieces which require extremely small and accurate dimensions, such as small radii, are usually machined to the desired dimensions by applying a cutting tool to the workpiece, withdrawing the tool, removing the workpiece from the machine and checking its dimensions, and then replacing the workpiece and repeating the procedure until the dimensions are satisfactory. This procedure of gradually reducing the dimensions and checking them after each cut until the desired size is achieved, is extremely time consuming. In addition, it is unsatisfactory in that an excessively large cut may inadvertently be made, in which case the procedure must be repeated with a new workpiece.

The problem is further magnified when a workpiece such as a lens has a number of surfaces which must be separately machined. The above-mentioned procedure must be employed, but the possibility of inadvertently reducing one of the dimensions below its desired size is substantially increased.

The present invention contemplates an optical system which obviates these difficulties by enabling the operator of the machine to view an enlarged image of the tool and the workpiece before, during or after the machining operation. A viewing surface is employed having suitable graduations or diagrams so as to inform the operator watching the image of the tool and workpiece projected upon the viewing surface as to the size of the cut made in the workpiece.

In a preferred embodiment of the present invention which will be subsequently described in detail, the present optical system is employed in combination with a machine for cutting lenses. A tool is adapted to swing about an axis in a predetermined arc so as to cut the workpiece surface to a desired radius. A lamp provides a beam of light which is focused upon the tool and workpiece, the beam of light extending parallel and adjacent to the axis about which the tool moves. In this manner, the profile of the workpiece and tool is projected to a mirror which in turn reflects the image upon a sheet of suitably graduated paper. Using this apparatus, the operator can view and measure the size of the arc defined by the tool before cutting is begun, and ordinarily can view the workpiece surface during and after the actual machining operation.

It is therefore an object of the present invention to provide, in machines of the type described, an improvement in which an image of the workpiece and cutting tool is projected upon a suitable viewing surface so as to enable the operator of the machine to view the movement of the cutting tool and the surface of the workpiece, before, during or after the machining operation.

A further object of the present invention is to provide such an improvement wherein means are provided for enabling the operator to measure the size of the resulting cut in the workpiece surface without removing the workpiece from the machine.

Another object is to provide such an improvement wherein the cutting operation remains uninterrupted while the image of the workpiece and tool are projected for viewing.

Other objects and advantages will be more readily apparent from the following detailed description of a preferred embodiment of the present invention. The description refers to the drawings in which:

FIGURE 1 is a side view, partly in section, of a preferred embodiment of the present invention;
FIGURE 2 is a sectional view of a chuck for flat lens blanks;
FIGURE 3 is a sectional view of a chuck for lenses having a pre-cut concave surface;
FIGURE 4 is a sectional view taken along the lines 4—4 in FIGURE 1; and
FIGURE 5 is a plan view taken substantially along the lines 5—5 in FIGURE 4.

Referring to the drawings in detail, a machine for cutting lenses is illustrated having a base 10, and a motor 12 supported upon the base on legs 14. The motor is adapted to rotate a threaded shaft 16 which extends through a vertical wall 18 fixed to the face of the motor.

A carriage generally indicated at 20 supports a tool holder 22 and is adapted to be translatable in two horizontal directions. This is accomplished by means of transverse and axial feed screws, 24 and 26, of the type commonly employed in lathes and other machine tools. When the handle 28 on the transverse screw 24 is rotated, the carriage 20 moves transversely to the axis of the motor shaft 16. When the handle 30 on the axial screw 26 is rotated, sleeve 32 to which the upper portion of the carriage is connected moves parallel to the axis of the shaft. An extension 34 is bolted to the upper free end of the sleeve 32. The forward end of the extension 34 is circular in shape and has a vertical opening 36 into which a pivot arm 38 is journaled. Ball bearings 40 with suitable supporting material 41 are mounted between the arm and extension at the connection.

The pivot arm 38 includes a vertical circular opening 42 which extends through the opening 36 in the extension 34. The pivot arm is thus free to pivot about the vertical axis of the opening 42. A flat circular glass plate 44 is disposed horizontally in a small countersunk enlargement 46 in the top of the vertical opening 42.

The tool holder 22 comprises a tubular housing 47 welded at 48 and 50 to the rearward extension 52 of the pivot arm 38, and a horizontal micrometer feed screw 54 which holds the cutting bit 56 in position at one end. The feed screw 54 is disposed along matching threads on the interior of a barrel member 58 which is in turn fixed to the interior of the housing 47. A handle 60 and micrometer calibrations 62 at the rearward end of the feed screw 54, in combination with extremely fine threads along the screw, provide an extremely accurate motion for the screw and bit 56.

A lamp 64, suitably connected to an electrical source, is disposed below an opening 66 in the base 10. A lens 68 in the opening, focuses light from the lamp upwards through the vertical opening 42 which is situated directly above the lamp 64 and lens 68, and through the glass plate 44. The glass plate serves to catch the particles of lens material removed by the cutting tool and to prevent them from falling to the bed 10 below. Then lens is adapted to focus the light so as to strike the free end of a chuck 70 having a threaded opening 71 fitting over the end of the shaft 16. The resulting profile is projected upward through a tube 72 which is supported on the vertical wall 18 by means of a bracket 74 and a bolt 76. The upper part of the tube is suitably countersunk to hold a second lens 78 which focuses the light upwards towards a mirror 80. The mirror is supported at the end of an arm 82 which is in turn supported vertically above the motor 12 by means of a holder 83 and a vertical rod 84 positioned in a support member 86 connected to the vertical wall 18.

As shown in FIGURE 4, the mirror 80 is inclined from horizontal so that the upwardly focused beam of light is reflected diagonally downward on to a sheet of graph paper 88 lying on a horizontal support 90 to one side of the machine. A line 92 drawn to the proper scale on the graph paper defines the desired arc to be subtended by the bit 56 during the cutting operation.

FIGURE 2 illustrates a chuck 70 having a flat face 94 on which the flat surface of a lens 96 is mounted. The lens is held in place by means of adhesive spread between the two adjacent surfaces. A concave surface 98 is cut into the opposing face of the lens 96.

In FIGURE 3, the concave surface 98 is held in place with adhesive material against the matching convex end 100 of another chuck 70. The outer surface 102 of the lens 96 is ground to form a conventional convex surface.

In operation, a lens blank having opposing parallel flat ends is mounted at the end of a chuck 70 having a flat face, as in FIGURE 2, which is mounted in the machine. The cutting bit 56 is moved forward by adjustment of the micrometer feed screw 54 until the end of the bit protrudes beyond the axis of the pivot arm 38. The distance between the axis of the arm 38 and the cutting edge of the bit will determine the radius of the concave surface 98 cut into the open face of the lens 96 as shown in FIGURE 2. The micrometer calibration 62 correspond to this radius.

The entire carriage 20 is moved transversely until the axis of the bit 56 coincides with the axis of the chuck 70 and shaft 16. The carriage is then moved towards the workpiece 96 until the bit 56 is just short of the workpiece. With the lamp 64 illuminated, the tool holder 22 and pivot arm 38 are rotated about the axis of the arm. An enlarged profile of the cutting bit is projected on the graph paper 88.

By calculating the amount of magnification produced by this optical system, and suitably marking the lines on the graph paper 88, the operator directly measures the radius of the arc defined by the bit 56 as it swings about the axis of the arc 38. This serves to check the setting of the micrometer feed screw 54 which can now be adjusted if necessary.

When the feed screw 54 is properly adjusted, the motor 12 is actuated to rotate the chuck 70 and the workpiece 96. The carriage 20 is moved forward until the bit 56 contacts the face of the workpiece. The tool holder 22 and the pivot arm 38 are rotated about the axis of the arm, cutting a concave surface 98 into the workpiece. The radius of this surface will very closely match the radius subtended on the graph paper 88.

After suitable polishing of the concave surface 98, the lens 96 is mounted on a second chuck 70 as shown in FIGURE 3, which is inserted in the machine. The concave surface 98 is held by adhesive against the convex face 100 of the chuck 70. The micrometer feed screw 54 is adjusted so that the distance between the bit 56 and the axis of the arm 38 is equal to the desired radius of the cut to be made in the lens; by positioning the bit on the side of the axis opposite to the motor 12, a convex cut of this radius will be made.

The radius of the arc defined by the bit, as projected on the graph paper 88, is measured in the same manner as was previously described. When the necessary adjustments of the feed screw 54 are completed, the carriage is moved forward and the convex surface 102 is cut into the lens 96 by rotating the tool holder 22 and arm 38 about the axis of the arm. The profile of the bit 56 and the workpiece 96 are visible on the graph paper during the cutting operation.

The width of the opening 42 in the arm 38 is sufficiently large so that the carriage 20 may be shifted to accommodate lens workpieces of various sizes and still permit a profile of the bit and workpiece to be projected for viewing. It is also wide enough so that the profile of the bit can be projected when it is in slightly retracted position preliminary to cutting in order that the arc it defines may be measured and corrected, if necessary.

If a workpiece requires more than one radius cut into its surface, this may be accomplished by moving the carriage 20 transversely so as to position the bit 56 opposite different points on the face of the workpiece, and to alter the size of the radius as desired.

The mirror 80 and its supporting structure may be adjustable so that the support 90 and graph paper 88 may be moved about to any position desired by the operator. It might also be desired to alter the distance between the mirror and the graph paper 88 so as to increase or decrease the amount of magnification of the image.

Having thus described my invention, I claim:

1. A machine tool, including, in combination:

a driving motor having an output shaft extending along a first axis;

means for supporting a workpiece on said shaft for rotation about said first axis;

a tool carriage supported for motion along second and third perpendicular axes, one of which is parallel to said first axis and the other of which is perpendicular thereto;

a cutting tool;

means for supporting the cutting tool on the carriage for rotation about an axis perpendicular to said first, second, and third axes, said support means comprising a cylindrical bearing member having its central axis perpendicular to said first, second and third axes, and an extension arm journalled in said bearing and connected to said cutting tool, said bearing member having a central aperture therethrough; and an optical system including a source of illumination and a lens projection system operative to form a beam of light passing through said aperture in the bearing and the point of contact between said cutting tool and said workpiece so as to project an image of such area for visual inspection by a machine operator.

2. The structure of claim 1 wherein the optical system includes a first lens disposed between the workpiece and the source of illuimnation, a mirror disposed on the side of the workpiece opposite to that of the source of illumination, a second lens disposed between said mirror and said workpiece, and a screen operative to receive an image of the workpieces projected by the mirror, said aperture in the bearing being disposed between said source of illumination and said mirror.

References Cited by the Examiner

UNITED STATES PATENTS

| | | |
|---|---|---|
| 1,766,800 | 6/1930 | Peterson et al. |
| 2,197,308 | 4/1940 | Kolb et al. |
| 2,298,992 | 10/1942 | Warmisham et al. |
| 2,372,470 | 3/1945 | Bergstrom et al. |
| 2,451,155 | 10/1948 | De Boer et al. |
| 2,476,312 | 7/1949 | Luety. |
| 2,485,355 | 10/1949 | Brennan. |
| 2,802,393 | 8/1957 | Young. |

LESTER M. SWINGLE, *Primary Examiner.*

WILLIAM MISIEK, *Examiner.*